United States Patent
Boeld et al.

(10) Patent No.: US 9,746,028 B2
(45) Date of Patent: Aug. 29, 2017

(54) SELF-SENSING ACTIVE MAGNETIC BEARING SYSTEMS AND METHODS

(71) Applicant: GENERAL ELECTRIC COMPANY, Schenectady, NY (US)

(72) Inventors: Christoph Boeld, Bayern (DE); Mohamed Osama, Bayern (DE)

(73) Assignee: General Electric Company, Niskayuna, NY (US)

( * ) Notice: Subject to any disclaimer, the term of this patent is extended or adjusted under 35 U.S.C. 154(b) by 245 days.

(21) Appl. No.: 14/572,369

(22) Filed: Dec. 16, 2014

(65) Prior Publication Data
US 2016/0169280 A1 Jun. 16, 2016

(51) Int. Cl.
*H02K 7/09* (2006.01)
*F16C 32/04* (2006.01)
(Continued)

(52) U.S. Cl.
CPC ........ *F16C 32/0451* (2013.01); *F16C 32/048* (2013.01); *F16C 32/0448* (2013.01);
(Continued)

(58) Field of Classification Search
CPC .............. F16C 32/0451; F16C 32/0448; F16C 32/048; F16C 43/00; F16C 32/0474;
(Continued)

(56) References Cited

U.S. PATENT DOCUMENTS 3,823,990 A * 7/1974 Gilinson, Jr. ....... F16C 32/0408
310/90.5
4,245,869 A * 1/1981 Scheffer ................ F16C 32/048
310/90.5
(Continued)

FOREIGN PATENT DOCUMENTS

GB 1500809 A 2/1978
JP WO 2014041752 A1 * 3/2014 .......... F16C 32/0461

OTHER PUBLICATIONS

Ren et al., "Study on estimation of rotor position of self-sensing active magnetic bearings", Journal of Physics: Conference Series, 2007 International Symposium on Nonlinear Dynamics (2007 ISND), Institute of Physics Publishing, Bristol, GB, vol. No. 96, Issue No. 1, pp. 1-7, Feb. 2008.

European Search Report and Written Opinion issued in connection with corresponding EP Application No. 15199676.6-1751 dated Apr. 29, 2016.

Graca, P., et al.; "Sensorless measurement of the air gap in magnetic bearing systems"; Electrodynamics and Mechatronics (SCEIII), 2011 3rd International Students Conference; Oct. 2011, pp. 95-98.

*Primary Examiner* — Thomas Truong
(74) *Attorney, Agent, or Firm* — Nitin N. Joshi (57) ABSTRACT

One embodiment describes a rotary machine system, which includes a stator with a first tooth, a second tooth, a third tooth, and a fourth tooth; a first electromagnet that includes a first electromagnet wire wrapped around the second tooth and the third tooth and that generates a first magnetic field to attract a drive shaft; a first integrated position sensor, which includes a first sensor wire that carries a first current wrapped around the first tooth and the second tooth; a second integrated sensor, which includes a second sensor wire that carries a second current wrapped around the third tooth and the fourth tooth; and a controller that determines current position of the drive shaft based at least on change of inductance of the first sensor wire and the second sensor wire, and that instructs the first electromagnet to adjust magnitude of the first magnetic field based at least in part on the current position.

15 Claims, 8 Drawing Sheets

(51) Int. Cl.
*H01F 41/02* (2006.01)
*F16C 43/00* (2006.01)
*H02K 15/08* (2006.01)

(52) U.S. Cl.
CPC .......... *F16C 32/0474* (2013.01); *F16C 43/00* (2013.01); *H01F 41/02* (2013.01); *H02K 7/09* (2013.01); *H02K 15/08* (2013.01)

(58) Field of Classification Search
CPC .......... H01F 41/02; H02K 7/09; H02K 15/08; H02K 11/225
USPC .............................................. 310/90.5, 68 B
IPC ...................................................... H02K 7/09
See application file for complete search history.

(56) References Cited

U.S. PATENT DOCUMENTS

| | | |
|---|---|---|
| 5,036,236 A | 7/1991 | Wilson |
| 5,300,841 A | 4/1994 | Preston et al. |
| 5,300,842 A | 4/1994 | Lyons et al. |
| 5,300,851 A | 4/1994 | Nishikura et al. |
| 5,304,876 A | 4/1994 | Lemarquand et al. |
| 5,736,800 A | 4/1998 | Iannello et al. |
| 6,244,835 B1 | 6/2001 | Antaki et al. |
| 6,351,048 B1 * | 2/2002 | Schob .................. A61M 1/101 310/68 B |
| 6,965,181 B1 | 11/2005 | Heshmat et al. |
| 7,843,098 B2 | 11/2010 | Coenen et al. |
| 2010/0194225 A1 | 8/2010 | Allaire et al. |
| 2014/0145534 A1 | 5/2014 | Kammer |

* cited by examiner

SELF-SENSING ACTIVE MAGNETIC BEARING SYSTEMS AND METHODS

BACKGROUND

The present disclosure relates generally to bearing assemblies, and more particularly, to positional determination of a drive shaft in an active magnetic bearing assembly.

Generally, a bearing assembly may be used to facilitate rotational motion of a drive shaft running through the bearing assembly, for example, by constraining motion of the shaft to a desired path and/or reducing friction between the drive shaft and other components. Accordingly, bearing assemblies may be utilized in rotary machine systems such as turbo compressor systems, gas turbine systems, vacuum pump systems, and the like. In some such systems, a bearing assembly may be utilized on a drive shaft that rotates approximately 10,000-100,000 rotations per minute (RPM). Due to the high rotation speeds and high reliability requirements, a magnetic bearing assembly may be utilized.

In some embodiments, a magnetic bearing assembly may support the shaft using magnetic levitation. For example, an active magnetic bearing assembly may include multiple electromagnets, which each generates one or more magnetic fields that exert an attractive force on the drive shaft. For example, an active magnetic bearing assembly may include four electromagnets positioned 90 degrees from one another. In this manner, the force exerted by each electromagnet may be controlled to maintain the drive shaft in a desired (e.g., centered) position. In other words, the operation of the electromagnets may be controlled based at least in part on a determined position of the drive shaft within the magnetic bearing assembly.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A first embodiment describes a rotary machine system. The rotary machine system includes an active magnetic bearing assembly that facilitates rotation of a drive shaft. The active magnetic bearing assembly includes a stator with a first tooth, a second tooth, a third tooth, and a fourth tooth that are radially spaced from the drive shaft; a first electromagnet that includes a first electromagnet wire wrapped around the second tooth and the third tooth, in which the first electromagnet generates a first magnetic field that exerts an attractive force on the drive shaft toward the first electromagnet; a first integrated position sensor that includes a first sensor wire wrapped around the first tooth and the second tooth, in which the first sensor wire carries a first current; and a second integrated sensor that includes a second sensor wire wrapped around the third tooth and the fourth tooth, in which the second sensor wire carries a second current. The rotary machine system additionally includes a controller that determines current position of the drive shaft based at least in part on change of inductance of the first sensor wire and the second sensor wire, and that instructs the first electromagnet to adjust magnitude of the first magnetic field based at least in part on the current position.

A second embodiment describes a tangible, non-transitory, computer-readable medium that includes instructions executable by a processor of a controller in a rotary machine system. The instructions include instructions to instruct, using the processor, a power supply to supply a first electrical power to a first sensor wire wrapped around a first tooth and a second tooth of a stator of an active magnetic bearing assembly; instruct, using the processor, the power supply to supply a second electrical power to a second sensor wire wrapped around a third tooth and a fourth tooth of the stator, in which the first electrical power and the second electrical power are 180° phase shifted; determine, using the processor, amplitude of a first current in the first sensor wire and amplitude of a second current in the second sensor wire; determine, using the processor, a current position of a drive shaft in the active magnetic bearing assembly based at least in part on amplitude of the first current and amplitude of the second current; and instruct, using the processor, the power supply to supply a third electrical power to a first electromagnet wire wrapped around the first tooth and the third tooth of the stator such that the first electromagnet wire generates a magnetic field that moves the drive shaft from the current position toward a desired position.

A third embodiment describes a method that includes forming an electromagnet in an active magnetic bearing assembly by forming a first plurality of coils around a first tooth and a second tooth on a stator of the active magnetic bearing assembly such that the first plurality of coils generates an electromagnet magnetic field that exerts an attractive force on a drive shaft; forming a first integrated position sensor in the active magnetic bearing assembly by forming a second plurality of coils around the first tooth and a third tooth of the stator such that the second plurality of coils generate a first sensor magnetic field that induces a first voltage in the first plurality of coils; and forming a second integrated position sensor in the active bearing assembly by forming a third plurality of coils around the second tooth and a fourth tooth of the stator such that the third plurality of coils generate a second sensor magnetic field that induces a second voltage in the first plurality of coils, in which the first voltage and the second voltage are opposite in polarity and equal in magnitude.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, bearing assemblies may be used to facilitate rotational motion of a drive shaft running through the bearing assembly. For example, an active magnetic bearing assembly may utilize multiple electromagnets to maintain the drive shaft in a desired (e.g., centered) position and reduce rotational resistance on the drive shaft. More specifically, based at least in part on the amount of current supplied, each of the electromagnets may generate a magnetic field, which exerts a force to attract the dive shaft toward the electromagnet. Thus, the electromagnets may be positioned radially around the drive shaft to levitate the drive shaft within the active magnetic bearing assembly.

Additionally, in some embodiments, the electromagnets may be organized in pairs such that each pair of electromagnets controls position of the drive shaft in one axis. For example, a first and a second electromagnet may control position of the shaft in an x-axis and a third and a fourth electromagnets may control position of the shaft in the y-axis. In such an embodiment, the position of the drive shaft may be moved in a positive x-direction by increasing the magnetic field generated by the second electromagnet and moved in a negative x-direction by increasing the magnetic field generated by the first electromagnet. Similarly, the position of the drive shaft may be moved in a positive y-direction by increasing the magnetic field generated by the third electromagnet and moved in a negative y-direction by increasing the magnetic field generated by the fourth electromagnet.

In this manner, the drive shaft may be maintained in a desired (e.g., centered) position within the active magnetic bearing assembly by controlling the magnetic field generated by each electromagnet. More specifically, the magnitude of magnetic field generated by each electromagnet may be controlled to move the drive shaft from a current position toward the desired position. In other words, to facilitate maintaining the shaft in the desired position, the current position of the shaft within the active magnetic bearing assembly may be determined, for example, using position sensors.

Accordingly, it would be beneficial to enable positional determination of a drive shaft within an active magnetic bearing assembly. As will be described in more detail below, one embodiment describes an active magnetic bearing assembly that includes four electromagnets, which each generates a magnetic field to exert an attractive force on the drive shaft. More specifically, each electromagnet may include an electromagnet wire wrapped around two or more teeth of a stator. In this manner, when current flows through the electromagnet wire, a magnetic field may be generated to pull the drive shaft toward the electromagnet. In fact, the amount of current supplied to each electromagnet may control the magnitude of the generated magnetic field, thereby controlling the force exerted on the drive shaft.

Additionally, the active magnetic bearing assembly may include integrated position sensors, which may be used to facilitate determining position of the drive shaft within the active magnetic bearing assembly. More specifically, the integrated position sensors may each include a sensor wire wrapped around two or more teeth of the stator, which are also used by electromagnets. In this manner, when a current flows through the sensor wire, the position of the shaft relative to the integrated position sensor may be determined based on changes to amplitude of AC current in the sensor wires.

More specifically, the distance of the drive shaft relative to an integrated sensor may vary inversely with the impedance of the sensor wire. For example, when the gap between the drive shaft and the integrated position sensor is smaller, the impedance may increase, thereby decreasing the amplitude of the AC current in the sensor wire. On the other hand, when the gap between the shaft and the integrated position sensor is larger, the impedance may decrease, thereby increasing the amplitude of the AC current in the sensor wire. In this manner, the position of the drive shaft relative to each integrated sensor may be determined, thereby enabling position of the drive shaft in the active magnetic bearing assembly to be determined. However, since teeth are shared between the electromagnets and the integrated position sensors, a voltage may be induced in the electromagnet wires when current flows through the sensor wires. Every impedance connected to the terminals of the electromagnets would therefore influence or disturb the sensing signal. Accordingly, to reduce the likelihood of inducing a voltage in the electromagnet wires, the integrated position sensors may be offset from the electromagnets. For example, a first integrated position sensor may include a sensor wire wrapped around a first tooth, which is used in a first electromagnet, and a second tooth, which is used in a second electromagnet. Similarly, a second integrated position sensor may include a sensor wire wrapped around a third tooth, which is used in the first electromagnet, and a fourth tooth, which is used in a third electromagnet. Additionally, the phase of the electrical supplied to the first and the second integrated position sensors may be 180° phase shifted. In this manner, the voltages induced by the first and second integrated position sensors in the first electromagnet may cancel out, thereby reducing the likelihood of inducing a voltage in the first electromagnet and improving sensing signal quality.

Accordingly, the techniques described herein may enable determining position of a shaft in an active magnetic bearing assembly using position sensors integrated with the electromagnets of the magnetic bearing assembly. In fact, the use of integrated position sensors may obviate the use of stand-alone position sensors, which may reduce axial length of an active magnetic bearing assembly, increase robustness of the position sensors particularly in extreme conditions (e.g., high temperatures, high pressure, or toxic gases), reduce manufacturing costs, and/or reduce component costs. Additionally, since the likelihood of the voltage being induced in the electromagnets is reduced, the electrical power supplied to the integrated position sensors may be at a frequency that is not audible.

Figure 1:
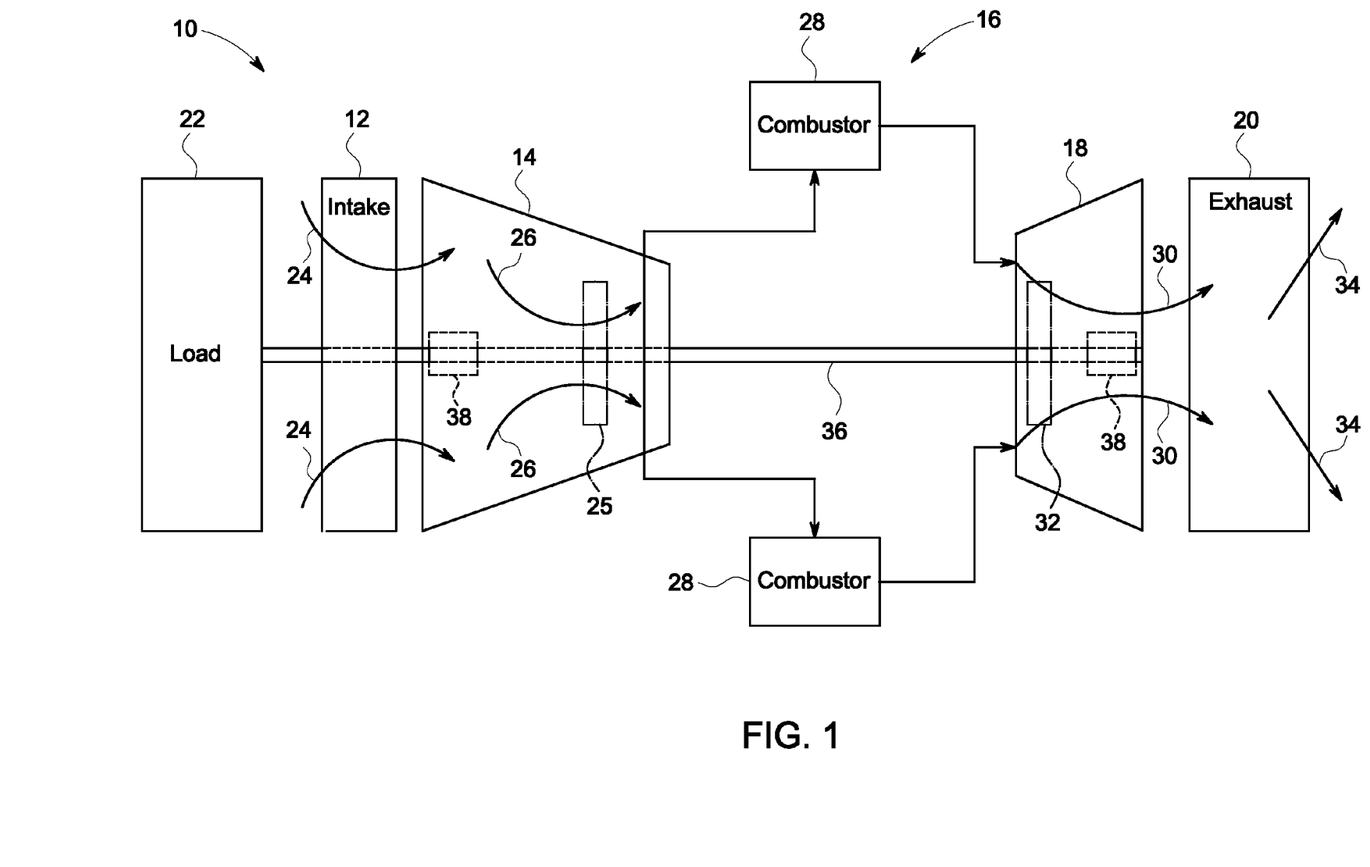
FIG. 1 describes a schematic diagram of a gas turbine system, in accordance with an embodiment.

To help illustrate, a schematic view of a rotary machine system 10 is described in FIG. 1. More specifically, the rotary machine system 10 may be a turbo compressor system, a gas turbine system, or a vacuum pump system. As depicted, the rotary machine system 10 includes an air intake section 12, a compressor section 14, a combustor section 16, a turbine section 18, an exhaust section 20, and a load 22.

More specifically, the air intake section 12 may channel air 24 into the compressor section 14. The compressor section 14 may then compress the inlet air 24 using the rotation of one or more compressor blade assemblies 25 to generate compressed air 26, which is channeled into the combustor section 16. In the combustor section 16, the compressed air 26 may be mixed with fuel and burned within one or more combustors 28, thereby generating combustion gases 30. The combustion gases 30 may then be channeled into the turbine section 18 and through one or more turbine blade assemblies 32. More specifically, the combustion gases 30 may exert a force on the turbine blade assemblies 32, thereby causing the turbine blade assemblies 32 to rotate. Exhaust gas 34 from the rotary machine system 10 may then be expelled into the ambient atmosphere via the exhaust section 20.

In this manner, thermal energy is converted to mechanical rotational energy. More specifically, as depicted, the turbine section 18 is connected to the compressor section 14 and/or the load 22 via a drive shaft 36, which may enable the mechanical rotational energy captured by the turbine blade assembly 32 to be transferred to the compressor blade assembly 25 and/or the load 22. For example, the rotation of the turbine blade assembly 32 may cause the compressor blade assembly 25 to rotate, thereby compressing the inlet air 24. Additionally, when the load 22 is an electrical generator, the load 22 may convert the mechanical rotational energy into electrical energy for storage or distribution, for example, to residential and commercial users.

To facilitate rotation of the drive shaft 36, bearing assemblies 38 may be included in the compressor section 14 and/or the turbine section 18. More specifically, the bearing assemblies 38 may maintain the drive shaft 36 in a desired axial position (e.g., by dampening vibrational energy) and/or reduce friction on rotation of the drive shaft 36. In other embodiments, the bearing assemblies may be positioned at various locations along the length of the drive shaft 36.

As described above, due to high rotational speeds of the drive shaft 36, the bearing assembly 38 may be an active magnetic bearing assembly. To help illustrate, a schematic view of an active magnetic bearing assembly 38 is described in FIG. 2. As depicted, the active magnetic bearing assembly 38 includes a stator 40 with eight approximately equal sized teeth 42 positioned radially around the drive shaft 36. Although the described embodiment utilizes eight teeth 42, other embodiments may utilize any suitable number of teeth 42 (e.g., twelve teeth, sixteen teeth, twenty teeth, or more).

Figure 2:
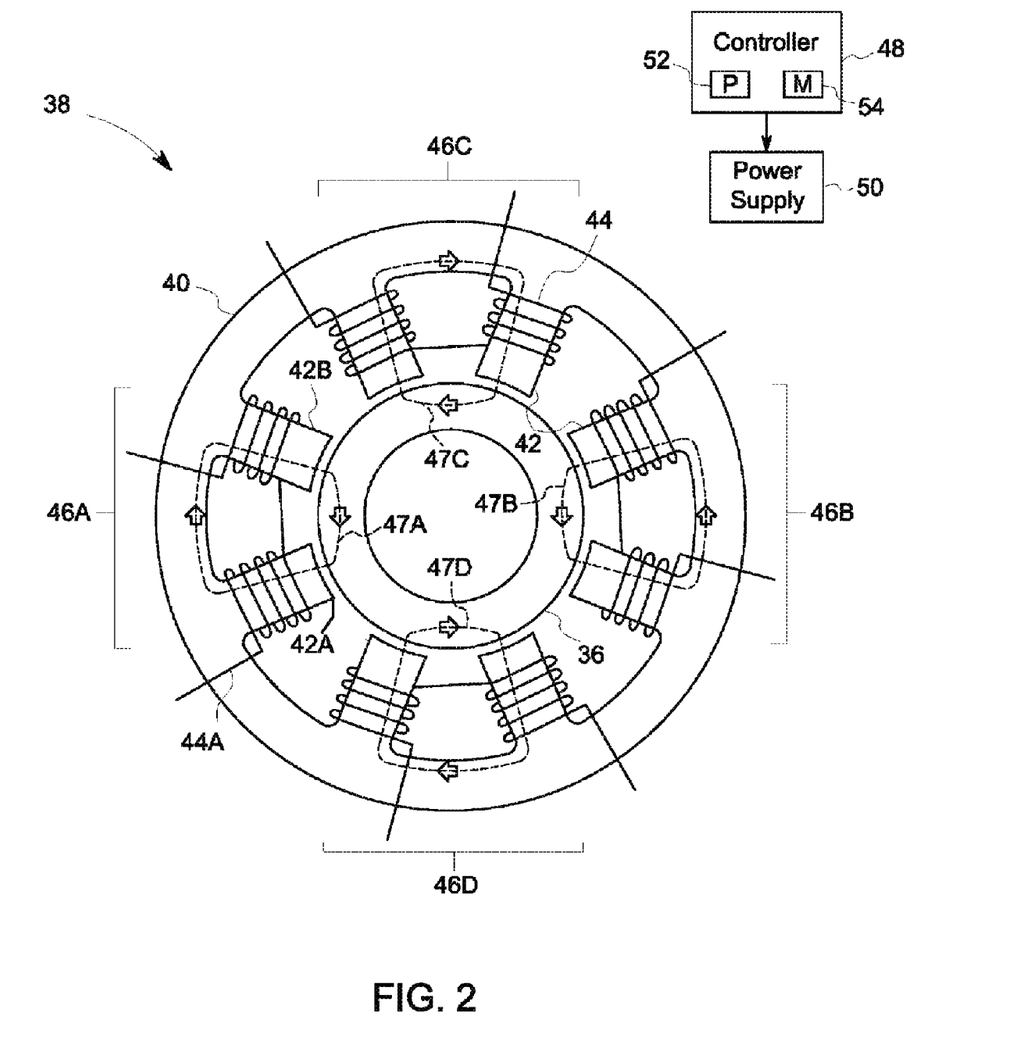
FIG. 2 describes a schematic diagram of a magnetic bearing system with eight teeth, in accordance with an embodiment.

Generally, an electromagnet 46 may be formed by wrapping an electromagnet wire 44 around two or more adjacent teeth 42. For example, in the depicted embodiment, a first electromagnet 46A is formed by wrapping a first electromagnet wire 44A around a first tooth 42A and a second tooth 42B. In this manner, when current flows through the first electromagnet wire 44A, the first electromagnet 46A generates a magnetic field 47A that flows through the second tooth 42B, through the drive shaft 36, through the first tooth 42A, and back into the second tooth 42B, which pulls the drive shaft 36 in the direction of the first electromagnet 46A. Similarly, a second electromagnet 46B may generate a magnetic field 47B that pulls the drive shaft 36 in the direction of the second electromagnet 46B, a third electromagnet 46C may generate a magnetic field 47C that pulls the drive shaft 36 in the direction of the third electromagnet 46C, and a fourth electromagnet 46D may generate a magnetic field 47D that pulls the drive shaft 36 in the direction of the fourth electromagnet 46D.

Additionally, one or more power supplies 50 may supply DC electrical power to one the electromagnets 46. As described above, the magnitude of current supplied to an electromagnet 46 may affect the magnitude of the magnetic field generated, and thus, the magnitude of the force exerted on the drive shaft 36 by the electromagnet 46. For example, when the magnitude of the current increases, the magnitude of the generated magnetic field increases, thereby increasing the force exerted on the drive shaft 36. On the other hand, when the magnitude of the current decreases, the magnitude of the generated magnetic field decreases, thereby decreasing the force exerted on the drive shaft 36.

As such, to maintain the drive shaft 36 in a desired (e.g., centered) position, a controller 48 may instruct the one or more power supplies 50 to supply a desired current magnitude to each of the electromagnets 46. For example, the controller 48 may instruct the one or more power supplies 50 to supply a desired current magnitude to the first electromagnet 46A and the second electromagnet 46B respectively to control position of the drive shaft 36 in a first axis (e.g., x-axis). Additionally, the controller 48 may instruct the one or more power supplies 50 to supply a desired current magnitude to the third electromagnet 46C and the fourth electromagnet 46D respectively to control position of the drive shaft 36 in a second axis (e.g., y-axis).

To facilitate controlling magnitude of current supplied to each electromagnet 46, as well as other functions, the controller 48 may include a processing component 52, such as one or more general purpose microprocessors, one or more application specific processors (ASICs), one or more field programmable logic arrays (FPGAs), or any combination thereof. Additionally, the controller 48 may include memory 54 that stores instructions executable by and data to be processed by the processing component 52. As such, the memory 54 may be a tangible, non-transitory, computer-readable medium, such as random access memory (RAM), read only memory (ROM), rewritable flash memory, hard drives, optical discs, and the like.

As described above, the operation of the electromagnets 46 may be controlled to control position of the drive shaft 36. Accordingly, the controller 48 may also determine current position of the drive shaft 36 within the active magnetic bearing assembly 38 using position sensors. More specifically, the position sensors may be integrated with the electromagnets 46 by sharing teeth 42 with the electromagnets 46. In fact, this may obviate the use of standalone position sensors, which may reduce axial length of an active magnetic bearing assembly 38, increase robustness of the position sensors particularly in extreme conditions (e.g., high temperatures, high pressure, or toxic gases), reduce manufacturing costs, and/or reduce component costs.

Figure 3:
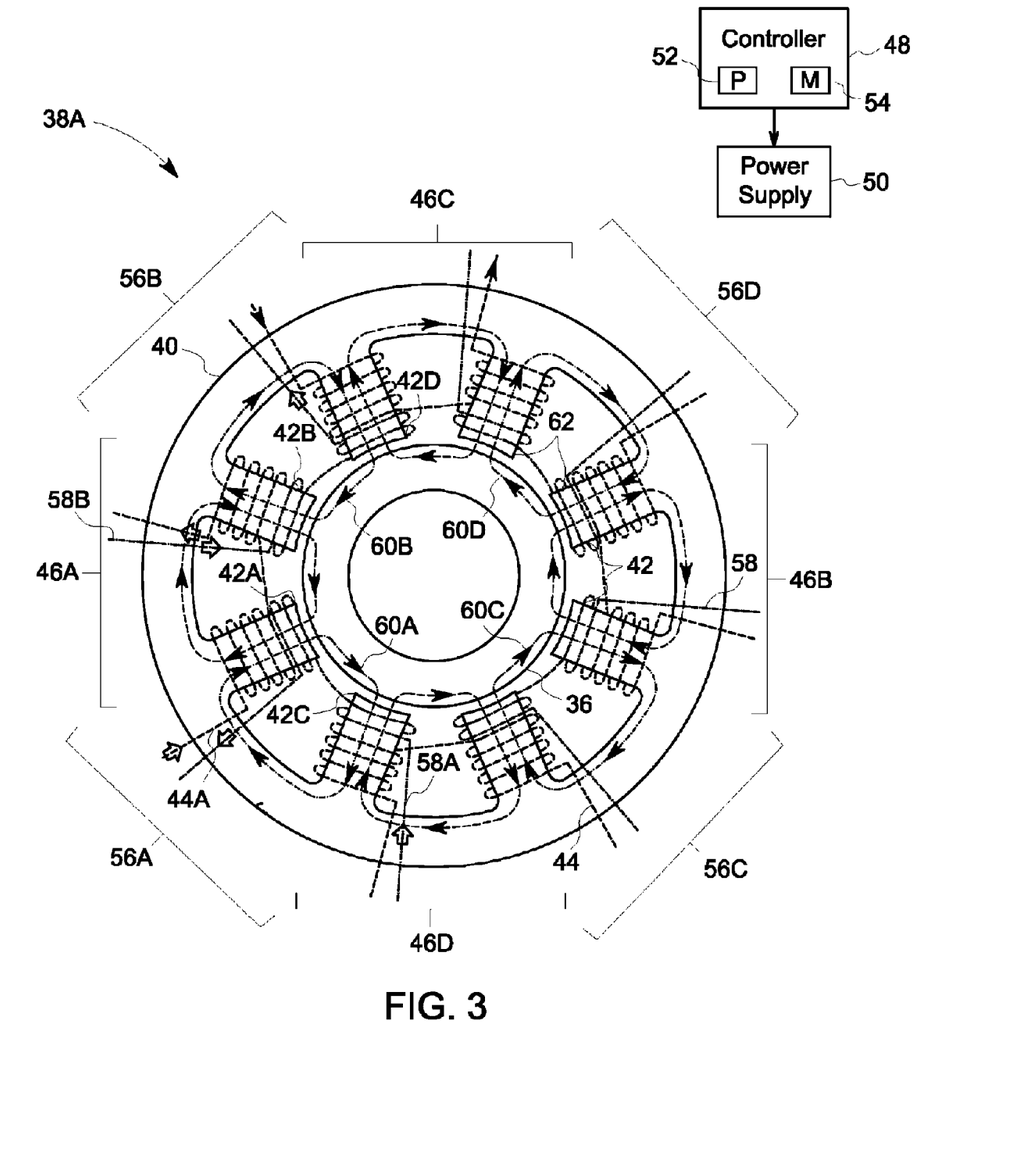
FIG. 3 describes a schematic diagram of the magnetic bearing system of FIG. 2 with integrated position sensors, in accordance with an embodiment.

To help illustrate, an embodiment of an active bearing assembly 38A with integrated position sensors 56 is described in FIG. 3. Generally, a sensor wire 58 may be wrapped around two or more adjacent teeth 42 of the stator 40 to form an integrated position sensor 56. For example, in the depicted embodiment, a first integrated position sensor 56A is formed by wrapping a first sensor wire 58A around a first tooth 42A and a third tooth 48C. Thus, when a positive current flows through the first sensor wire 58A, a magnetic field 60A that flows through the first tooth 42A, through the drive shaft 36, through the third tooth 42C, and back into the first tooth 42A is generated. On the other hand, when a negative current flows through the first sensor wire 58A, the magnetic field 60A may flow through the third tooth 42C, through the drive shaft 36, through the first tooth 42A, and back into the third tooth 42C.

As will be described in more detail below, the position of the drive shaft 36 relative to the an integrated position sensor 56 may affect the amplitude of current on the corresponding sensor wire 58. As such, the position of the drive shaft 36 relative to the first integrated position sensor 56A may be determined based at least in part on amplitude of current on the first sensor wire 58A. Similarly, a second integrated position sensor 56B may generate a magnetic field 60B that may be used to determine position of the drive shaft 36 relative to the second integrated position sensor 56B, a third integrated position sensor 56C may generate a magnetic field 60C used to determine position of the drive shaft 36 relative to the third integrated position sensor 56C, and a fourth integrated position sensor 56D may generate a magnetic field 60D used to determine position of the drive shaft 36 relative to the fourth integrated position sensor 56D.

Additionally, the one or more power supplies 50 may supply AC electrical power to one or more of the integrated position sensors 56. As described above, the amplitude of current in each sensor wire 58 may change based on position of the drive shaft 36 relative to the integrated position sensor 56. More specifically, as the drive shaft 36 moves closer to an integrated position sensor 56, the air gap 62 between the teeth 42 and the drive shaft 36 decreases, thereby increasing impedance (e.g., inductance) of the sensor wire 58. Thus, when the air gap 62 decreases, the increased impedance may cause the amplitude of the current in the sensor wire 58 to decrease. On the other, when the air gap 62 increases, the decreased impedance may cause the amplitude of the current in the sensor wire 58 to increase.

As such, the controller 52 may monitor the amplitude of the current in the sensor wires 58 to determine position of the drive shaft 36 relative to each of the integrated position sensors 56, and thus, determine position of the drive shaft 36 in the active magnetic bearing assembly 38A. For example, the controller 52 may determine that the drive shaft 36 is in a centered position (e.g., desired position) when amplitude of current in each of the sensor wires 58 is equal.

Even though the sensor wires 58 and the electromagnet wires 44 are electrically isolated, the magnetic field generated by each integrated position sensor 56 may induce a voltage in surrounding conductors, such as the electromagnet wires 44. Thus, to maintain operational reliability of the electromagnets 46, it would be beneficial to reduce the likelihood of any voltage being induced in the electromagnet wires 44. In some embodiments, it may be possible to connect a filter to the electromagnet wires 44 to filter out induced voltages, which may be caused when the position integrated position sensors 56 are not offset from the electromagnets 46.

Additionally or alternatively, as in the depicted embodiment, each integrated position sensor 56 may be offset from each of the electromagnets 46. More specifically, each sensor wire 58 is wrapped around two teeth 42 used in two different electromagnets 46. For example, the first sensor wire 58A is wrapped around the third tooth 42C, which is used in the fourth electromagnet 46D, and the first tooth 42A, which is used in the first electromagnet 46A. Similarly, a second sensor wire 58B is wrapped around the second tooth 42B, which is used in the first electromagnet 46A, and a fourth tooth 42D, which is used in the third electromagnet 46C. As such, the first integrated position sensor 56A and the second integrated position sensor 56B may be 90° offset from one another and 45° offset from the first electromagnet 46A.

Thus, when the one or more power supplies 50 supply electrical power to each integrated position sensor 56 such that the electrical power is 180° phase shifted from the electrical power supplied to the adjacent integrated position sensors 56, the likelihood of inducting voltage in the electromagnet wires 44 may be reduced. To help illustrate, a voltage plot 64, which describes voltages in the active magnetic bearing assembly 38A between t0 and t3, is described in FIG. 4. More specifically, the voltage plot 64 includes a first sensor waveform 66, which describes voltage in the first sensor wire 58A, a second sensor waveform 68, which describes voltage in the second sensor wire 58B, and a electromagnet waveform 70, which describes voltage induced in the first electromagnet wire 44A.

Figure 4:
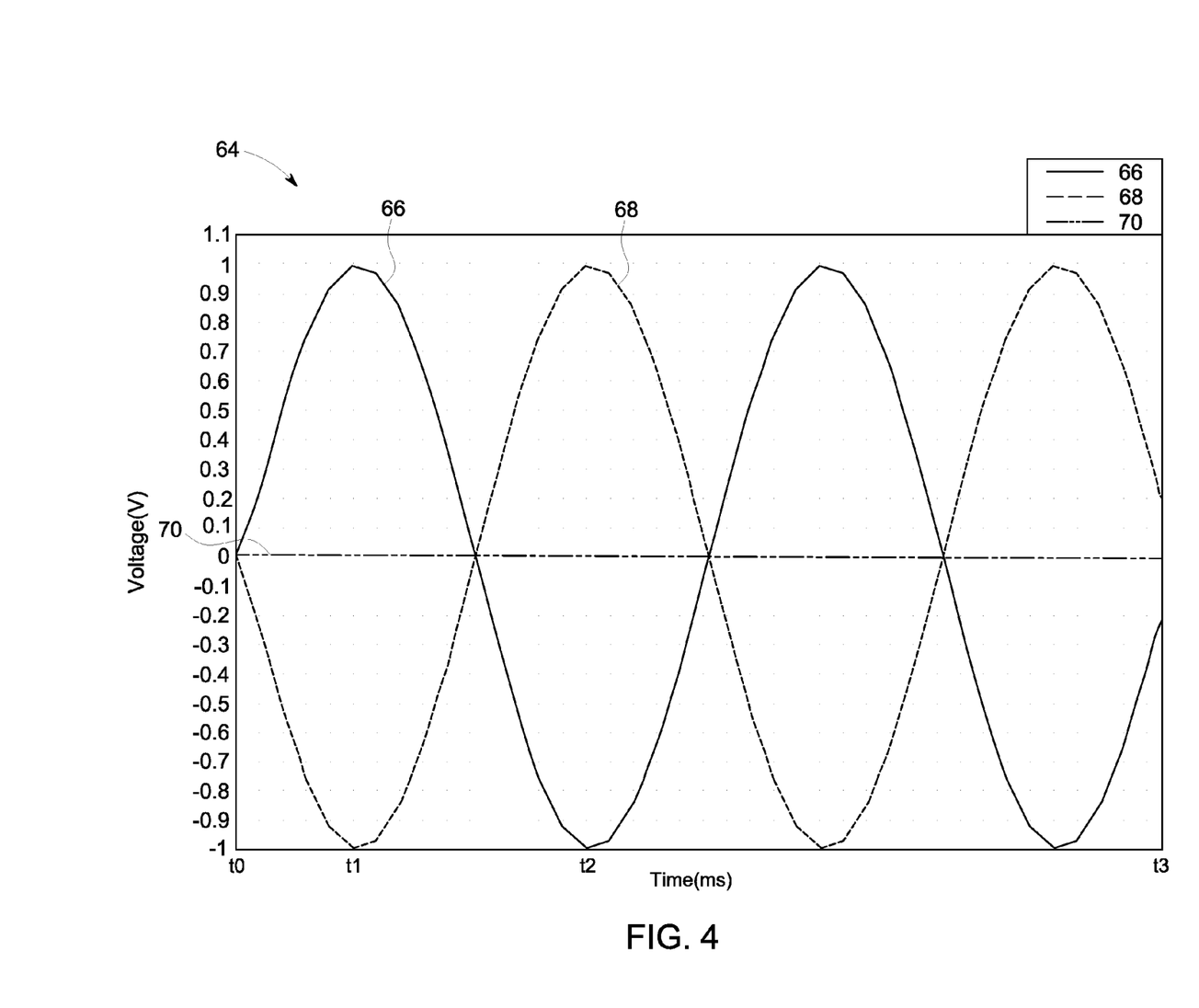
FIG. 4 describes a waveform diagram of voltages in the magnetic bearing system of FIG. 3, in accordance with an embodiment.

As depicted, the first sensor waveform 66 and the second sensor waveform 68 are 180° phase shifted. More specifically, as depicted, the voltage in the first sensor wire 58A is increasing while the voltage in the second sensor wire 58B is decreasing between t0 and t1. As such, the first sensor wire 58A may induce a positive voltage in the first electromagnet wire 44A and the second sensor wire 58B may induce a negative voltage in the first electromagnet wire 44A.

Additionally, as depicted, the voltage in the first sensor wire 58A is decreasing while the voltage in the second sensor wire 58B is increasing between t1 and t2. As such, the first sensor wire 58A may induce a negative voltage in the first electromagnet wire 44A, and the second sensor wire 58B may induce a positive voltage in the first electromagnet wire 44A. In this manner, the first sensor wire 58A and the second sensor wire 58B may alternate between inducing a positive voltage and a negative voltage in the first electromagnet wire 44A from t0 to t3 and beyond.

Moreover, when the rate of change of the voltages is equal, the magnitude of the induced positive voltages may be equal to the magnitude of the negative voltage at each point in time. In other words, the positive voltage and the negative voltage may cancel out, thereby resulting in approximately a net zero volts being induced on the first electromagnet wire 44A. Thus, as depicted, the electromagnet waveform 70 is approximately zero volts between t0 and t3. Furthermore, any induced voltage may be further reduced using a filter connected to the electromagnet wire 44. As such, the likelihood of the integrated position sensors 56 signals being distorted is reduced.

In this manner, although integrated (e.g., utilizing the same teeth 42), the electromagnets 46 may operate as desired to control position of the driver shaft 36 while the integrated position sensors 56 facilitate determining position of the driver shaft 36. As described above, the likelihood of getting distorted or wrong sensing signals may be reduced in an active magnetic bearing assembly 38 that utilizes integrated position sensors 56 offset from the electromagnets 46.

In return the electromagnet winding can induce voltages into the sensing windings since both windings share the same teeth. However, voltages coming from the electromagnets are typically low in frequency (e.g., 500 Hz, related to the mechanical frequencies of the shaft) compared to the sensing frequencies (e.g., 20000 Hz). Therefore, the sensing signal can easily be separated by applying a high pass filter.

Figure 5:
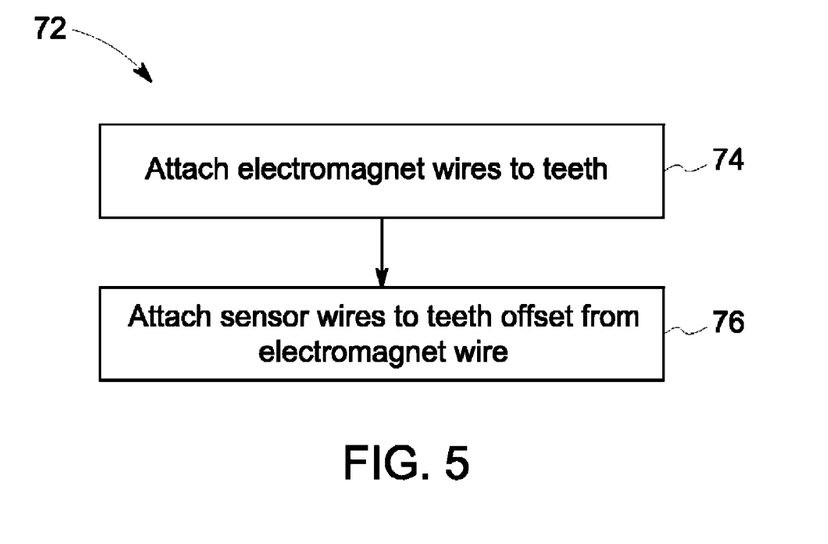
FIG. 5 describes a process diagram for assembling a magnetic bearing system, in accordance with an embodiment.

One embodiment of a process 72 for assembling one such active magnetic bearing assembly 38 is described in FIG. 5. Generally, the process 72 includes attaching an electromagnet wire to two or more teeth (process block 74) and attaching a sensor wire to two or more teeth offset from the electromagnet wire (process block 76). In some embodiments, the process 78 may be implemented by a manufacturer of the active magnetic bearing assembly 38 using instructions stored in any suitable tangible non-transitory computer-readable medium and executable by any suitable processing circuitry.

Accordingly, the manufacture may form an electromagnet 46 by wrapping an electromagnet wire 44 around two or more teeth 42 of a stator 40 (process block 74). For example, a first electromagnet 46A may be formed by wrapping a first electromagnet wire 44A around a first tooth 42A and a second tooth 42B. More specifically, the first electromagnet wire 44A may be wrapped around the teeth 42A and 42B to form one or more coils around each tooth 42A or 42B. Moreover, the first electromagnet wire 44A may be wrapped in opposite directions on the teeth 42A and 42B such that the magnetic field generated in each is in the same direction (e.g., through the second tooth 42B, through the drive shaft 36, through the first tooth 42A, and back into the second tooth 42B). In a similar manner, each of the other electromagnets (e.g., 46B, 46C, and 46D) may be formed by wrapping a corresponding electromagnet wire 44 around two adjacent teeth 42.

Although the above example describes electromagnets formed by wrapping an electromagnet wire 44 around two adjacent teeth 42, other embodiments may utilize electromagnets 46 formed by wrapping an electromagnet wire 44 around three adjacent teeth 42 or around four adjacent teeth 42. Some such embodiments will be described in more detail below. However, one of ordinary skill in the art should recognize how to expand the techniques described herein to any configuration of electromagnets 46 in an active magnetic bearing assembly 38.

Additionally, the manufacture may form an integrated position sensor 56 by wrapping a sensor wire 58 around two or more of the teeth 42 offset from an electromagnet wire 44, thereby forming coils around each of the two or more teeth 42 (process block 76). For example, a first integrated position sensor 56A may be formed by wrapping a first sensor wire 58A around a first tooth 42A, which is used in a first electromagnet 46A, and a third tooth 42C, which is used in a fourth electromagnet 46D. Additionally, a second integrated position sensor 58B may be formed by wrapping a second sensor wire 58B around a second tooth 42B, which is used in the first electromagnet 46A, and a fourth tooth 42D, which is used in a third electromagnet 46C. In this manner, the first electromagnet may share teeth 42A and 42B with two integrated position sensors 56A and 56B.

In a similar manner, each of the other integrated position sensors (e.g., 56C and 56D) may be formed by wrapping a corresponding sensor wire 58 around two adjacent teeth 42 offset from the electromagnet wires 44. Thus, in the embodiment described above (e.g., with eight teeth 42), each integrated position sensor 56 may be offset from adjacent electromagnets 46 by one tooth 42.

Moreover, each sensor wire 58 may be wrapped around the two or more teeth 42 to generate a magnetic field in the same direction. For example, the first sensor wire 58A may be wrapped in opposite directions on the teeth 42A and 42C such that they generate magnetic field in the same direction. Thus, when the first sensor wire 58A has a positive current, a magnetic field may be generated that flows through the first tooth 42A, through the drive shaft 36, through the third tooth 42C, and back into the first tooth 42A. On the other hand, when the first sensor wire 58A has a negative current, a magnetic field may be generated that flows from the third tooth 42C, through the drive shaft 36, through the first tooth 42A, and back into the third tooth 42C. In this manner, when the voltage supplied to each adjacent integrated position sensors is 180° phase shifted, any voltage induced in the electromagnet 46 is canceled out, thereby reducing the likelihood of operation of the electromagnets 46 begin undesirably affected by the integrated position sensors 56.

As described above, the integrated position sensors 56 may facilitate the controller 48 to maintain the drive shaft 36 in a desired (e.g., centered) position. One embodiment of a process 78 for maintaining the drive shaft 36 in a desired position is described in FIG. 6. Generally, the process 78 includes supplying electrical power to integrated position sensors (process block 80), determining current position of a drive shaft (process block 82), and supplying electrical power to the electromagnets (process block 84). In some embodiments, the process 78 may be implemented using instructions stored in the controller memory 54 and/or another suitable tangible non-transitory computer-readable medium and executable by the controller processor 52 and/or another suitable processing circuitry.

Figure 6:
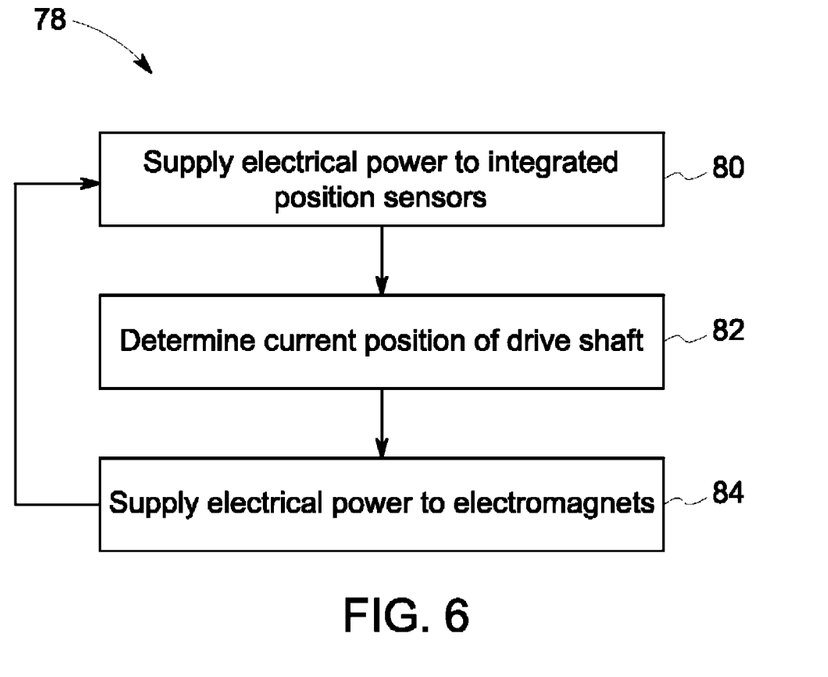
FIG. 6 describes a process diagram for operating a magnetic bearing system, in accordance with an embodiment.

Accordingly, the controller 48 may instruct the one or more power supplies 50 to supply electrical power to each of the integrated position sensors 56 (process block 80). More specifically, the controller 48 may instruct the one or more power supplies 50 to supply desired AC electrical power to each of the sensor wires 58. In some embodiments, the AC electrical power may be sinusoidal. Additionally, as described above, the electrical power supplied to the sensor wire 58 in an integrated position sensor 56 may be 180° phase shifted from the electrical power supplied to the sensor wire 58 in each adjacent integrated position sensor 56 (e.g., integrated sensor position sensors 56 that shares teeth 42 with the same electromagnet 46).

Based on the current in each of the sensor wires 58, the controller 48 may determine current position of the drive shaft 36 (process block 82). In some embodiments, the controller 48 may determine the current in the sensor wires 58 using one or more sensors (e.g., voltage sensors or current sensors) coupled to the sensor wires 58. More specifically, based on the readings received from the one or more sensors, the controller 48 may determine the position of the drive shaft 36 relative to each of the integrated position sensors 56.

Figure 7:
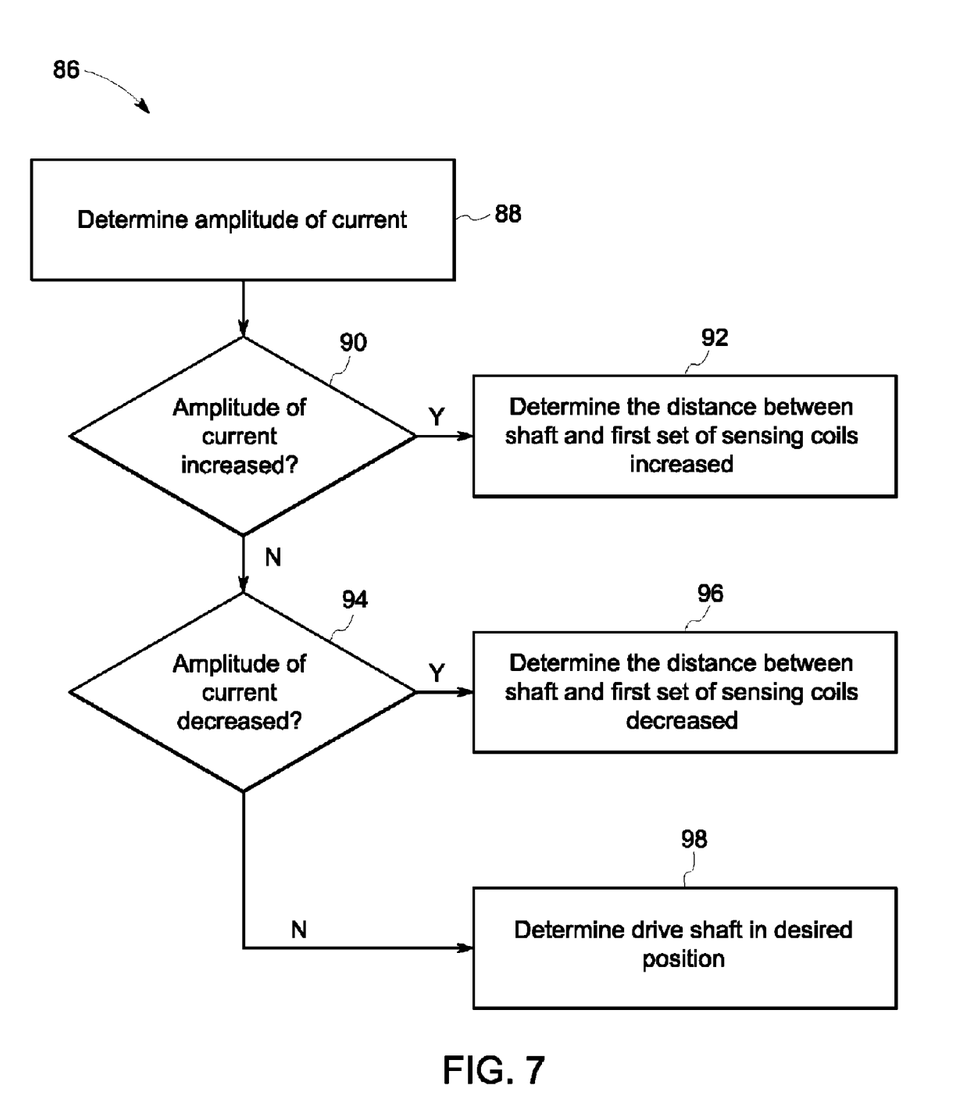
FIG. 7 describes a process diagram for determining position of shaft in a magnetic bearing system, in accordance with an embodiment.

To help illustrate, one embodiment of a process 86 for determining position of the drive shaft 36 relative to an integrated position sensor 56 is described in FIG. 7. Generally, the process 86 includes determining the amplitude of current in the sensor wire (process block 88), determining whether amplitude of the current has increased (decision block 90), and determining that distance between the integrated position sensor and the drive shaft increased when the amplitude of the current has increased (process block 92). Additionally, the process 86 includes determining whether amplitude of the current has decreased (decision block 94) and determining that distance between the integrated position sensor and the drive shaft has decreased when the amplitude of the current has decreased (process block 96). Furthermore, the process 86 includes determining that the drive shaft is in a desired position when the amplitude of the current has not increased or decreased (process block 98). In some embodiments, the process 86 may be implemented using instructions stored in the controller memory 54 and/or another suitable tangible non-transitory computer-readable medium and executable by the controller processor 52 and/or another suitable processing circuitry.

Accordingly, the controller 48 may determine amplitude of the current in the sensor wire 58 using one or more sensors coupled to the sensor wire 58 (process 88). In some embodiments, the one or more sensors may be current sensors that measure current on the sensor wire 58 and transit a signal indicating the measured current to the controller 48. Accordingly, the controller 48 may periodically poll the one or more current sensors (e.g., every 5 ms) or continuously receive the signal indicating the measured current. In this manner, the controller 48 may monitor the current in the sensor wire 58, and thus, determine amplitude of the current.

After determining amplitude of the current, the controller 48 may determine whether the amplitude has increased (decision block 90). In some embodiments, the controller 48 may compare the determined amplitude to a desired amplitude corresponding with a desired (e.g., centered) position of the drive shaft 36, which may be pre-determined and stored in memory 54, to compare current position to a desired position. Additionally or alternatively, the controller 48 may compare the determined amplitude to one or more previously determined amplitudes, which may be stored in memory 54, to determine trends in position of the drive shaft 36.

When the amplitude has increased, the controller 48 may determine that distance between the integrated position sensor 56 and the drive shaft 36 has increased (process block 92). More specifically, when the determined amplitude is compared to a desired amplitude, the controller 48 may determine that the drive shaft 36 is farther from the integrated position sensor 92 than the desired distance. Additionally or alternative, when the determined amplitude is compared to one or more previously determine amplitudes, the controller 48 may determine that the drive shaft is moving away from the integrated position sensor 92.

On the other hand, when the amplitude has not increased, the controller 48 may determine whether the amplitude has decreased (process block 94). In some embodiments, the controller 48 may compare the determined amplitude to a desired amplitude corresponding with a desired (e.g., centered) position of the drive shaft 36, which may be pre-determined and stored in memory 54, to compare current position of the drive shaft 36 to the desired position. Additionally or alternatively, the controller 48 may compare the determined amplitude to one or more previously determined amplitudes, which may be stored in memory 54, to determine trends in the position of the drive shaft 36.

When the amplitude has decreased, the controller 48 may determine that distance between the integrated position sensor 56 and the drive shaft 36 has decreased (process block 96). More specifically, when the determine amplitude is compared to a desired amplitude, the controller 48 may determine that the drive shaft 36 is closer to the integrated position sensor 92 than the desired distance. Additionally or alternative, when the determined amplitude is compared to one or more previously determine amplitudes, the controller 48 may determine that the drive shaft is moving toward the integrated position sensor 92.

On the other hand, when the amplitude has not increased or decreased, the controller 48 may determine that the drive shaft 36 is in the desired position (process block 98). In this manner, the controller 48 may determine position of the drive shaft 36 relative to each of the integrated position sensors 56 in the active magnetic bearing assembly 38. The controller 48 may then translate the relative positions to determine position of the drive shaft 36 within the active magnetic bearing assembly 38. For example, when the drive shaft 36 is closer to the third integrated position sensor 56C and the fourth integrated position sensor and farther from the first integrated position sensor 56A and the second integrated position sensor 56B, the controller 48 may determine that the drive shaft 36 has moved in a positive x-direction.

Based on the determined current position of the drive shaft 36, the controller 48 may instruct the one or more power supplies 50 to supply electrical power to the electromagnets 46 (process block 94). More specifically, the controller 48 may instruct the one or more power supplies 50 to supply DC electrical power to the electromagnets 46 to maintain the drive shaft 36 toward the desired (e.g., centered) position. For example, when the drive shaft is in a positive x-direction as compared to the desired position, the controller 48 may instruct the one or more power supplies 50 to increase current supplied to the first electromagnet 46A causing the first electromagnet 46A to exert greater attractive force on the drive shaft 36, thereby moving the drive shaft 36 in a negative x-direction toward the desired position. Additionally or alternatively, the controller 48 may instruct the one or more power supplies 50 to decrease current supplied to the second electromagnet 46B causing the second electromagnet 46B to exert less attractive force on the drive shaft, thereby moving the drive shaft 36 in the negative x-direction toward the desired position.

Moreover, although the current position of the drive shaft 36 is in the desired position, the drive shaft 36 may be moving toward an undesired position. As such, when trend of position of the drift shaft 36 is determined, the controller 48 may determine rate at which the drive shaft 36 is changing position. For example, when the drive shaft 36 is moving in the negative x-direction toward the desired position, the controller 48 may determine that the movement is at too high of a rate, which may cause the drive shaft 36 to move past the desired position and into an undesired position in the negative x-direction. Accordingly, the controller 48 may instruct the one or more power supplies 50 to adjust current supplied to the first electromagnet 46A and/or the second electromagnet 46B to reduce the likelihood of over adjusting position of the drive shaft 36. In other words, the controller 48 may predict position of the drive shaft 36 and preemptively adjust electrical power supplied to one or more of the electromagnets 46.

To further improve the predictive abilities of the active magnetic bearing assembly 38, the controller 38 my monitor external (e.g., environmental) factors. More specifically, in addition to being caused by force exerted by each of the electromagnets 46, movement of the drive shaft 36 within the active magnetic bearing assembly 38 may also be caused by external (e.g., environmental) factors, such as vibration. Accordingly, the controller 38 may determine external factors, for example using, one or more sensors.

For example, the controller 48 may determine that a vibration is causing the drive shaft 36 to move toward the positive x-direction and adjust the electrical power supplied to the electromagnets 46 accordingly. Thus, when the controller 48 determines that the vibration has ceased, the controller 48 may preemptively adjust the electrical power supplied to the electromagnets 46 to stop compensating for the vibration. Accordingly, the controller 48 may determine the effect various external factors have on the position of the drive shaft 36 using the integrated position sensors 56 and store the relationship in memory 54. In this manner the controller 48 may preemptively adjust current supplied to the electromagnets 46, thereby improving the likelihood of the drive shaft 36 being maintained in the desired position.

As described above, the techniques described herein may be utilized in varying embodiments of active magnetic bearing assemblies 38. To help illustrate, two additional embodiments of active magnetic bearing assemblies 38 are described in FIGS. 8 and 9. More specifically, FIG. 8 describes an active magnetic bearing assembly 38B that utilizes twelve teeth 42. Additionally, FIG. 9 describes an active magnetic bearing assembly 38C that utilizes sixteen teeth 42.

Figure 8:
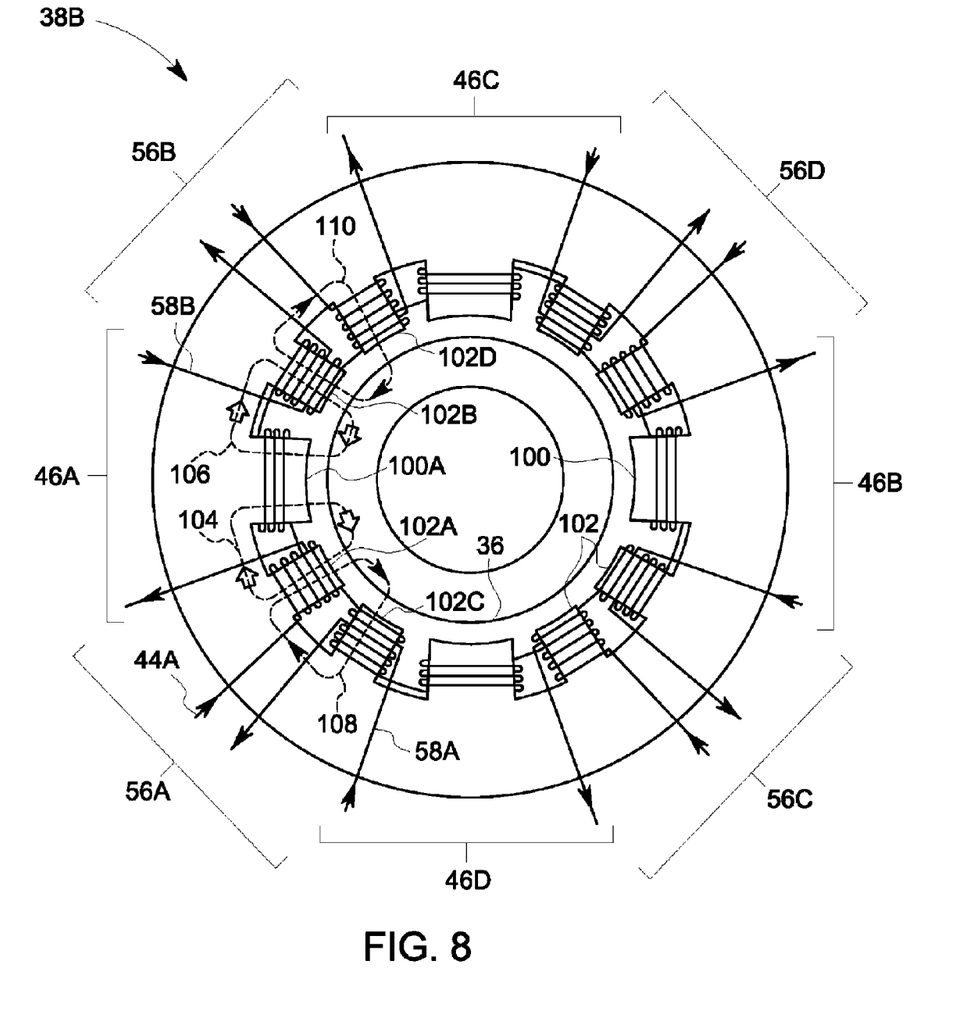
FIG. 8 describes a schematic diagram of a magnetic bearing system with twelve teeth and integrated position sensors, in accordance with an embodiment.

In FIG. 8, the active magnetic bearing assembly 38B is organized into four electromagnets 46. In the depicted embodiment, an electromagnet 46 is formed by wrapping an electromagnet wire 44 around three adjacent teeth 42, in which the middle tooth 100 is larger than the two side teeth 102. For example, in the depicted embodiment, a first electromagnet 46A is formed by wrapping a first electromagnet wire 44A around a first side tooth 102A, a first middle tooth 100, and a second side tooth 102B. In this manner, when current flows through the first electromagnet wire 44A, a first electromagnet magnetic field 104 flows through the first middle tooth 100A, through the drive shaft 36, through the first side tooth 102A, and back into the first middle tooth 100A. Additionally, a second electromagnet magnetic field 106 flows through the second side tooth 102B, through the drive shaft 36, through the first middle tooth 100A, and back into the second side tooth 102B. As such, the first magnetic field 104 and the second magnetic field 106 pull the drive shaft 36 in the direction of the first electromagnet 46A. Similarly, a second electromagnet 46B may generate magnetic fields that pull the drive shaft 36 in the direction of the second electromagnet 46B, a third electromagnet 46C may generate magnetic fields that pull the drive shaft 36 in the direction of the third electromagnet 46C, and a fourth electromagnet 46D may generate magnetic fields that pull the drive shaft 36 in the direction of the fourth electromagnet 46D.

Furthermore, as depicted, an integrated position sensor 56 is formed by wrapping a sensor wire 58 around two adjacent side teeth 102. For example, a first integrated position sensor 56A is formed by wrapping a first sensor wire 58A around the first side tooth 102A, which is used in the first electromagnet 46A, and a third side tooth 102C, which is used in the fourth electromagnet 46D. As such, when positive current flows through the first sensor wire 58A, a first sensor magnetic field 108 is generated that flows through the first side tooth 102A, through the drive shaft 36, through the third tooth 102C, and back into the first side tooth 102A. Similarly, a second integrated position sensor 56B is formed by wrapping a second sensor wire 58B around the second side tooth 102B, which is used in the first electromagnet 46A, and a fourth side tooth 102D, which is used in the third electromagnet 46C. As such, when positive current flows through the second sensor wire 58B, a second sensor magnetic field 110 is generated that flows through the fourth side tooth 102D, through the drive shaft 36, through the second side tooth 102B, and back into the fourth side tooth 102A.

Utilizing the techniques describe above, the position of the drive shaft 36 relative to each integrated position sensor 56 may be determined, which enables position of the drive shaft 36 within the active magnetic bearing assembly 38B to be determined. Moreover, since each of the integrated position sensors 56 is offset from the electromagnets 56, the likelihood of the integrated position sensor 56 inducing a voltage in the electromagnets 46 may be reduce when the electrical power supplied to each adjacent integrated position sensor 56 is 180° phase shifted.

Figure 9:
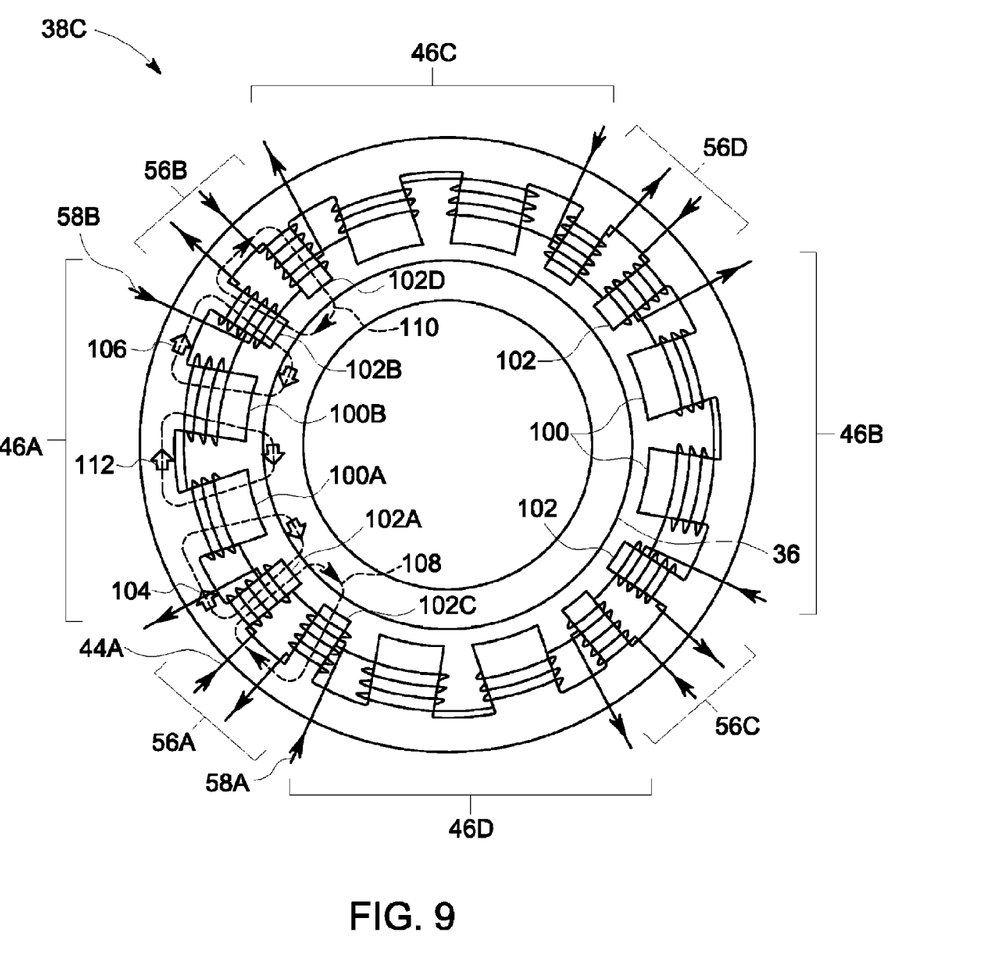
FIG. 9 describes a schematic diagram of a magnetic bearing system with sixteen teeth and integrated position sensors, in accordance with an embodiment.

In FIG. 9, the active magnetic bearing assembly 38C is organized into four electromagnets 46. In the depicted embodiment, an electromagnet 46 is formed by wrapping an electromagnet wire 44 around four adjacent teeth 42, in which the two middle teeth 100 are larger than the two side teeth 102. For example, in the depicted embodiment, a first electromagnet 46A is formed by wrapping a first electromagnet wire 44A around a first side tooth 102A, a first middle tooth 100A, a second middle tooth 100B, and a second side tooth 102B. In this manner, when current flows through the first electromagnet wire 44A, a first electromagnet magnetic field 104 flows through the first middle tooth 100A, through the drive shaft 36, through the first side tooth 102A, and back into the first middle tooth 100A. Additionally, a second electromagnet magnetic field 106 flows through the second side tooth 102B, through the drive shaft 36, through the second middle tooth 100B, and back into the second side tooth 102B. Furthermore, a third electromagnet magnetic field flows 112 through the first middle tooth 100A, through the drive shaft 36, through the second middle tooth 100B, and back into the first middle tooth 1002A. As such, the first magnetic field 104, the second magnetic field 106, and the third magnetic field 112 pull the drive shaft 36 in the direction of the first electromagnet 46A. Similarly, a second electromagnet 46B may generate magnetic fields that pull the drive shaft 36 in the direction of the second electromagnet 46B, a third electromagnet 46C may generate magnetic fields that pull the drive shaft 36 in the direction of the third electromagnet 46C, and a fourth electromagnet 46D may generate magnetic fields that pull the drive shaft 36 in the direction of the fourth electromagnet 46D.

Similar to the active magnetic bearing assembly 38B, as depicted, an integrated position sensor 56 is formed by wrapping a sensor wire 58 around two adjacent side teeth 102. For example, a first integrated position sensor 56A is formed by wrapping a first sensor wire 58A around the first side tooth 102A, which is used in the first electromagnet 46A, and a third side tooth 102C, which is used in the fourth electromagnet 46D. As such, when positive current flows through the first sensor wire 58A, a first sensor magnetic field 108 is generated that flows through the first side tooth 102A, through the drive shaft 36, through the third side tooth 102C, and back into the first side tooth 102A. Similarly, a second integrated position sensor 68B is formed by wrapping a second sensor wire 58B around the second side tooth 102B, which is used in the first electromagnet 46A, and a fourth side tooth 102D, which is used in the third electromagnet 46C. As such, when positive current flows through the second sensor wire 58B, a second sensor magnetic field 110 is generated that flows through the fourth side tooth 102D, through the drive shaft 36, through the second side tooth 102B, and back into the fourth side tooth 102A.

Utilizing the techniques describe above, the position of the drive shaft 36 relative to each integrated position sensor 56 may be determined, which enables position of the drive shaft 36 within the active magnetic bearing assembly 38C to be determined. Moreover, since each of the integrated position sensors 56 is offset from the electromagnets 56, the likelihood of the integrated position sensor 56 inducing a voltage in the electromagnets 46 may be reduce when the electrical power supplied to each adjacent integrated position sensor 56 is 180° phase shifted.

Accordingly, the technical effects of the present disclosure include providing integrated position sensors in an active magnetic bearing assembly to facilitate determining position of a driver shaft in the active magnetic bearing assembly, thereby facilitating maintaining the driver shaft in a desired (e.g., centered) position. More specifically, the position of the drive shaft relative to each of the integrated position sensors may be determined based at least in part on amplitude of current on sensor wires used in the integrated position sensors. Additionally, each electromagnet may share teeth with an even number of integrated position sensors and the integrated position sensors may be offset from the electromagnets. In this manner, when the electrical power supplied to each adjacent integrated position sensor is 180° phase shifted, the likelihood of inducing a voltage in the electromagnets may be reduced. Thus, the techniques described herein may facilitate maintaining the drive shaft in a desired position while also enabling the axial length of an active magnetic bearing assembly to be reduced, the robustness of position sensors to be increased, manufacturing costs to be reduced, and/or component costs to be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A rotary machine system, comprising:
   an active magnetic bearing assembly configured to facilitate rotation of a drive shaft, wherein the active magnetic bearing assembly comprises:
   a stator comprising a first tooth, a second tooth, a third tooth, and a fourth tooth configured to be radially spaced from the drive shaft;
   a first electromagnet comprising a first electromagnet wire wrapped around the first tooth and the second tooth, wherein the first electromagnet is configured to generate a first magnetic field that exerts an attractive force on the drive shaft toward the first electromagnet;
   a first integrated position sensor comprising a first sensor wire wrapped around the first tooth and the third tooth, wherein the first sensor wire is configured to carry a first current; and
   a second integrated position sensor comprising a second sensor wire wrapped around the second tooth and the fourth tooth, wherein the second sensor wire is configured to carry a second current; and
   a controller configured to determine current position of the drive shaft based at least in part on change of inductance of the first sensor wire and the second sensor wire, and to instruct the first electromagnet to adjust magnitude of the first magnetic field based at least in part on the current position.

2. The rotary machine system of claim 1, wherein the controller is configured to:
   determine that the current position of the drive shaft is closer to the first integrated position sensor than a desired position when the amplitude of the first current is less than an amplitude of a current associated with the desired position; and
   determine that the current position of the drive shaft is farther from the first integrated position sensor than the desired position when the amplitude of the first current is greater than the amplitude of the current associated with the desired position.

3. The rotary machine system of claim 1, wherein the controller is configured to instruct the first electromagnet to adjust magnitude of the first magnetic field by:
   instructing a power supply to increase current supplied to the first electromagnet wire when the current position of the drive shaft is farther from the first integrated position sensor and the second integrated position sensor than a desired position; or
   instructing the power supply to decrease current supplied to the first electromagnet wire when the current position of the drive shaft is closer to the first integrated position sensor and the second integrated position sensor than the desired position.

4. The rotary machine system of claim 1, comprising one or more power supplies configured to:
   supply a DC electrical power to the first electromagnet;
   supply a first AC electrical power to the first integrated position sensor; and
   supply a second AC electrical power to the second integrated position sensor, wherein the first AC electrical power and the second AC electrical power are 180° phase shifted.

5. The method of claim 4, wherein first AC electrical power and the second AC electrical power supplied to the integrated position sensors are at a frequency that is not audible.

6. The rotary machine system of claim 1, comprising:
   a third integrated position sensor comprising a third sensor wire wrapped around a fifth tooth and a sixth tooth of the stator, wherein the third sensor wire is configured to carry a third current;
   a fourth integrated position sensor comprising a fourth sensor wire wrapped around a seventh tooth and an eighth tooth of the stator, wherein the fourth sensor wire is configured to carry a fourth current;
   wherein the controller is configured to:
   determine a position of the drive shaft relative to the first integrated position sensor based at least in part on amplitude of the first current;
   determine the position of the drive shaft relative to the second integrated position sensor based at least in part on amplitude of the second current;
   determine the position of the drive shaft relative to the third integrated position sensor based at least in part on amplitude of the third current; and
   determine the position of the drive shaft relative to the fourth integrated position sensor based at least in part on amplitude of the fourth current.

7. The rotary machine system of claim 6, comprising:
a second electromagnet comprising a second electromagnet wire wrapped around the fourth tooth and the fifth tooth, wherein the second electromagnet is configured to generate a second magnetic field that exerts an attractive force on the drive shaft toward the second electromagnet; and
a third electromagnet comprising a third electromagnet wire wrapped around the sixth tooth and the seventh tooth, wherein the third electromagnet is configured to generate a third magnetic field that exerts an attractive force on the drive shaft toward the third electromagnet; and
a fourth electromagnet comprising a fourth electromagnet wire wrapped around the first tooth and the eighth tooth, wherein the fourth electromagnet is configured to generate a fourth magnetic field that exerts an attractive force on the drive shaft toward the fourth electromagnet.

8. The rotary machine system of claim 1, wherein the first electromagnet comprises the first electromagnet wire wrapped around the second tooth, the third tooth, and a middle tooth, wherein the middle tooth is between the second tooth and the third tooth and larger than the third tooth and the second tooth.

9. The rotary machine system of claim 1, wherein the first electromagnet comprises the first electromagnet wire wrapped around the second tooth, the third tooth, a first middle tooth, and a second middle tooth, wherein the first middle tooth and the second middle tooth are between the second tooth and the third tooth and larger than the third tooth and the second tooth.

10. The rotary machine system of claim 1, wherein the first integrated position sensor and the second integrated position sensor are 90° offset from one another and 45° offset from the first electromagnet.

11. The rotary machine system of claim 1, wherein the first sensor wire is configured to induce a first voltage in the first electromagnet wire, and the second sensor wire is configured to induce a second voltage in the first electromagnet wire, wherein the first voltage and the second voltage are opposite in polarity and equal in magnitude.

12. The method of claim 11, wherein a filter is connected to the first electromagnet wire to filter out the first voltage and the second voltage.

13. The rotary machine system of claim 1, wherein the stator comprises eight teeth, twelve teeth, or sixteen teeth.

14. The rotary machine system of claim 1, wherein the rotary machine system is a turbo compressor system, a gas turbine system, or a vacuum pump system.

15. The method of claim 1, wherein a voltage from the electromagnet coil has a frequency of about 500 Hz and voltages from the first and second position sensors have a frequency of about 20000 Hz.

* * * * *